United States Patent
Nagata et al.

(10) Patent No.: US 10,526,823 B2
(45) Date of Patent: Jan. 7, 2020

(54) VEHICLE DOOR LATCHING DEVICE

(71) Applicant: Mitsui Kinzoku Act Corporation, Kanagawa (JP)

(72) Inventors: Taichiro Nagata, Yokohama (JP); Akiya Okuda, Yokohama (JP)

(73) Assignee: Mitsui Kinzoku Act Corporation, Yokohama-Shi, Kanagawa (JP)

( * ) Notice: Subject to any disclaimer, the term of this patent is extended or adjusted under 35 U.S.C. 154(b) by 279 days.

(21) Appl. No.: 15/521,158

(22) PCT Filed: Feb. 24, 2015

(86) PCT No.: PCT/JP2015/055301
§ 371 (c)(1),
(2) Date: Apr. 21, 2017

(87) PCT Pub. No.: WO2016/067645
PCT Pub. Date: May 6, 2016

(65) Prior Publication Data
US 2017/0314303 A1    Nov. 2, 2017

(30) Foreign Application Priority Data
Oct. 28, 2014    (JP) .................................. 2014-219535

(51) Int. Cl.
*E05B 85/02*    (2014.01)
*E05B 79/20*    (2014.01)

(52) U.S. Cl.
CPC .............. *E05B 85/02* (2013.01); *E05B 79/20* (2013.01)

(58) Field of Classification Search
CPC .......... E05B 85/02; E05B 79/20; E05B 77/34; E05B 13/001; B60J 5/00; B60J 5/02; B60J 5/04; Y10S 292/38
(Continued)

(56) References Cited

U.S. PATENT DOCUMENTS 9,376,843 B2 *  6/2016  Akizuki ................. E05B 15/04
9,834,962 B2 * 12/2017  Suzumura ............. E05B 79/20
(Continued)

FOREIGN PATENT DOCUMENTS

| JP | 4050609 B2 | 2/2008 |
|----|-----------|--------|
| JP | 2013-113008 A | 6/2013 |

(Continued)

OTHER PUBLICATIONS

International Search Report and Written Opinion of the International Searching Authority, dated May 19, 2015, for corresponding International Application No. PCT/JP2015/055301, 5 pages.

*Primary Examiner* — Nathan Cumar
(74) *Attorney, Agent, or Firm* — Klarquist Sparkman, LLP (57) ABSTRACT

A vehicle door latch device comprises a casing, an operating lever, an auxiliary cover, and a hinge shaft on the auxiliary cover. The hinge shaft of the auxiliary cover rotatably engages in between a pair of elastic holding portions of the casing. A stopped portion is disposed on the auxiliary cover, and a stopper portion which the stopped portion can contact is disposed on the casing. When the auxiliary cover is rotated to open, the stopped portion gets over an end of the stopper portion and move to an opposite side, thereby holding the auxiliary cover provisionally in an open position.

8 Claims, 12 Drawing Sheets

(58) Field of Classification Search
USPC .......................................................... 292/337
See application file for complete search history.

(56) References Cited

U.S. PATENT DOCUMENTS

| | | | | |
|---|---|---|---|---|
| 2002/0074805 A1* | 6/2002 | Perkins | ................... | E05B 81/06 |
| | | | | 292/14 |
| 2011/0254287 A1* | 10/2011 | Akizuki | ................... | E05B 77/06 |
| | | | | 292/223 |
| 2012/0174692 A1* | 7/2012 | Haida | ................... | B60N 2/0232 |
| | | | | 74/108 |
| 2015/0247347 A1* | 9/2015 | Suzumura | ............... | E05B 79/20 |
| | | | | 292/2 |
| 2017/0314303 A1* | 11/2017 | Nagata | ....................... | B60J 5/00 |

FOREIGN PATENT DOCUMENTS

| | | | |
|---|---|---|---|
| JP | 2013-256185 | A | 12/2013 |
| JP | 2014-062441 | A | 4/2014 |
| JP | 5509377 | B1 | 6/2014 |

* cited by examiner

VEHICLE DOOR LATCHING DEVICE

CROSS REFERENCE TO RELATED APPLICATIONS

This is the U.S. National Stage of International Application No. PCT/JP2015/055301, filed Feb. 24, 2015, which in turn claims the benefit of and priority to Japanese Patent Application No. JP2014-219535, filed Oct. 28, 2014.

BACKGROUND OF THE INVENTION

The present invention relates to a vehicle door latch device.

In a conventional vehicle door latch device, the end of an operating lever disposed to rotate in the housing is exposed from the opening of the housing. After the end of the operating cable or a motion transmitting member is coupled to the end of the operating lever, a coupled portion and the end of the operating cable are covered with the auxiliary cover in JP2014-62441A.

The auxiliary cover in JP2014-62441A is pivotally mounted detachably to the housing to rotate in a closed position for closing the coupled portion of the operating lever to the operating cable and the end of the operating cable and an open position for opening the part.

There is provisionally holding means for holding the auxiliary cover provisionally in an open position to avoid a problem caused by freely rotating the auxiliary cover in the open position when the door latch device is connected to the door and when the operating lever is connected to the operating cable.

In the door latch device in JP2014-62441A, the hinge for mounting the auxiliary cover pivotally to the housing is complicated, and the holding means for holding the auxiliary cover provisionally in an open position is provided both in the housing and auxiliary cover, and is complicated in structure, thereby increasing the cost for molding the housing and the auxiliary cover.

SUMMARY OF THE INVENTION

In view of the disadvantages, it is an object of the invention to provide a vehicle door latch device in which an auxiliary cover is held provisionally in an open position by simple means.

DETAILED DESCRIPTION OF PREFERRED EMBODIMENTS

A door latch device of the present invention will be described with respect to the drawings.

FIGS. 1 to 9 illustrate a first embodiment of the door latch device according to the present invention. The door latch device 1 is fixed to a rear end of an inner panel D1 of a right front door D of a vehicle, and comprises an engagement unit 2 for holding the door D closed and an operating unit 3 for operating the engagement unit 2. The engagement unit 2 is integrally formed with the operating unit 3 to constitute the door larch device 1.

Figure 1:
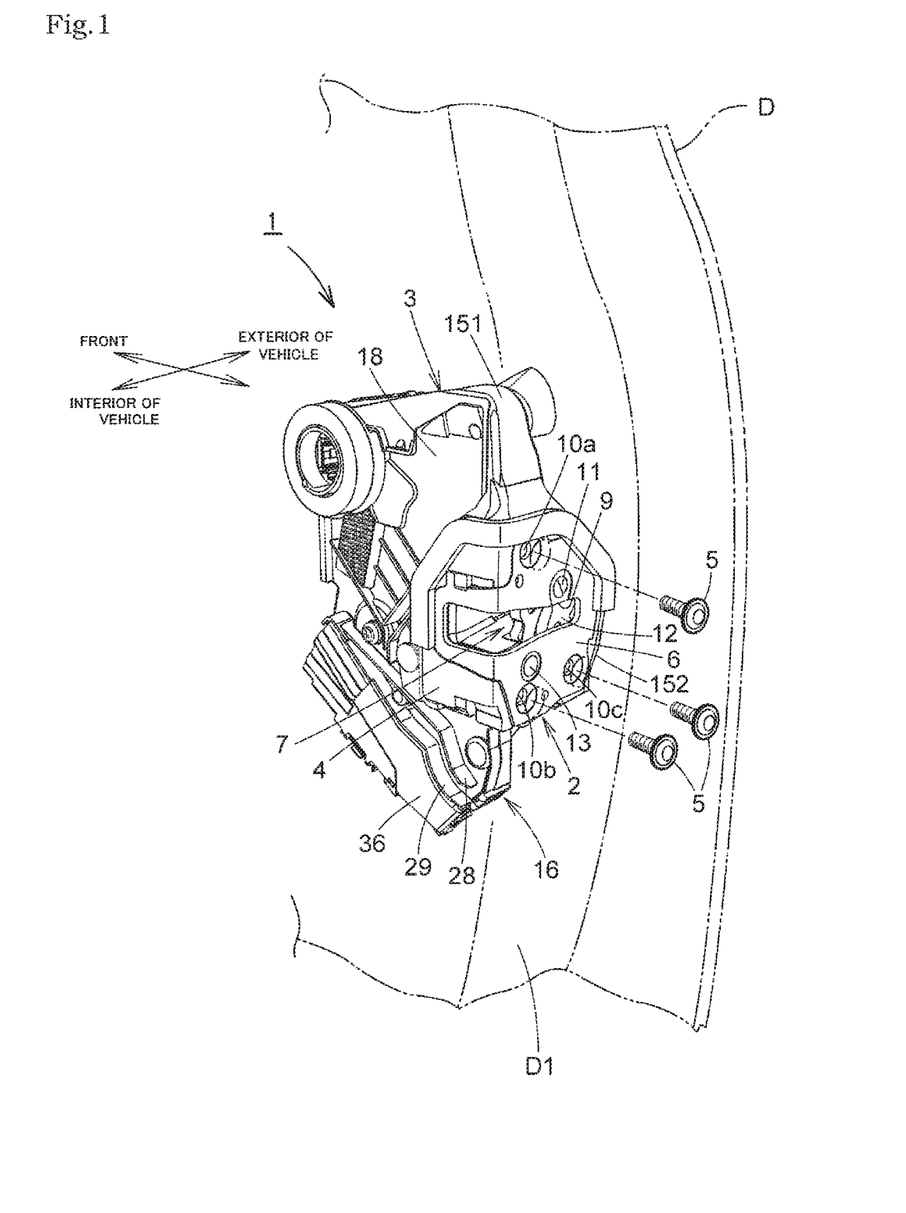
FIG. 1 is a perspective view of a first embodiment of a door latch device and a door to which the door latch device is attached, seen from the back obliquely at an interior of a vehicle.
Figure 2:
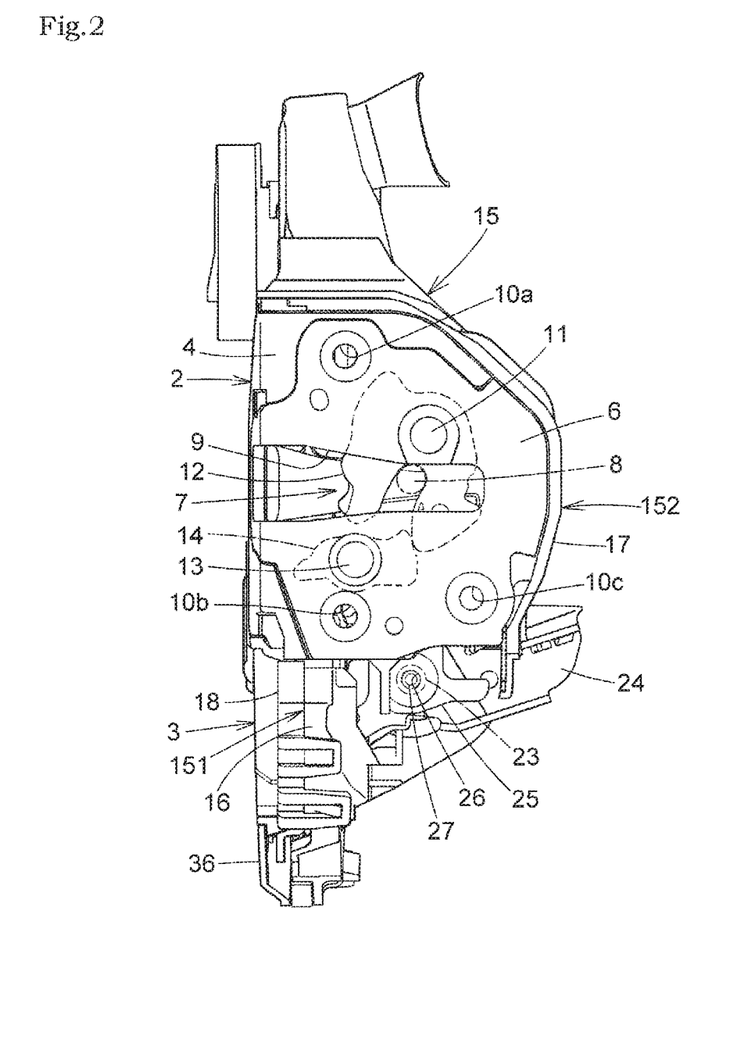
FIG. 2 is a back elevational view of the door latch device.

The engagement unit 2 comprises a boxlike synthetic-resin body 4 and a metal cover member 6 fixed to a rear surface of the body 4 and to a rear part of the inner panel D1 with the body 4 with three bolts 5. In an inner space between the body 4 and the cover member 6, there is an engagement mechanism 7 for holding the door closed. In the body 4 and the cover member 6, there is formed a striker-entering groove 9 into which a striker 8 of a vehicle body 8 comes when the door D is closed. The striker-entering groove 9 has substantially the same shape as the striker 8.

A female thread hole 10a is formed above the striker-entering groove 9 of the cover plate 6 by burring, and two female thread holes 10b, 10c are formed under the striker-entering groove 9 by burring. The bolts 5 engage in the female thread holes 10a, 10b, 10c, thereby fixing the engagement unit 2 to the inner panel D1 in FIG. 1.

The engagement mechanism 7 is pivotally mounted on a pivot shaft 11 in the body 4, is biased by a spring (not shown) in an opening direction or clockwise in FIG. 2, and comprises a latch 12 that can engage with the striker 8 and a ratchet 14 that is pivotally mounted on a pivot shaft 13 in the body 4 and can engage with an outer circumference of the latch 12. When the door D is closed, the striker 8 engages with the latch 12 and the ratchet 14 engages with an outer circumference of the latch 12 to prevent the latch 12 from rotating in the opening direction, so that the door D is closed.

When a locking lever 20 (later described) of the operating unit 3 is in an unlocking position, an outside lever 24 or an inside lever 22, later described, is rotated by an opening action of an outside handle (not shown) on the door D outside the vehicle or of an inside handle (not shown) on the door D inside the vehicle, the ratchet 14 is released from the outer circumference of the latch 12 by an opening lever (not shown) connected to the outside lever 24 and rotates in a releasing direction or clockwise in FIG. 2, so that the door can be opened.

The operating unit 3 comprises an L-shaped synthetic-resin casing 15. The casing 15 comprises a first synthetic-resin casing 151 disposed close to an inner side of the inner panel D1 and having an operating-mechanism holding portion 16 that is open toward the inside of the vehicle; a second synthetic-resin casing 152 extending at substantially right angles from a rear edge of a middle of a height of the first casing 151 and having a body holding portion 17 that is open at a rear side; and a synthetic-resin cover 18 that closes an opening of the operating-mechanism holding portion 16 of the first casing 151 except the striker-entering groove 9 of the body 4 of the engagement unit 2.

In a space formed between the operating-mechanism holding portion 16 and the cover 18 of the first casing 151, there is an operating mechanism that can change an unlocking state for releasing the engagement mechanism from the striker 8 and a locking state that is not capable of releasing the engagement mechanism 7 of the engagement unit 2 from the striker 8. The operating mechanism comprises an actuator (not shown) with a motor that performs locking/unlocking action automatically; a key lever (not shown) rotated with a key cylinder (not shown); a locking lever 20 connected to a locking knob (not shown) on the door inside the vehicle via a first Bowden cable 19 in FIG. 5 as a motion transmitting member and rotated to a locking position or an unlocking position by the locking knob or the actuator; an inside lever 22 connected to the inside handle (not shown) mounted on the door inside the vehicle via a second Bowden cable 21 in FIG. 5 as a motion-transmitting member and rotated with the inside handle; and an opening lever (not shown) connected to an inner end of the outside lever 24 (later described) rotating with the outside handle (not shown) mounted on the door outside the vehicle and connected to the key lever and the locking lever 20 to move between a locking position and an unlocking position. The elements of the operating mechanism do not directly relate to the present invention and are known in a convention door latch device. Detailed description thereof is not described.

In FIG. 2, a support shaft 23 that extends along a length of the vehicle projects backward at a lower part of a rear surface of the second casing 152 that projects downward of the engagement unit 2. The outside lever 24 is pivotally mounted vertically on the support shaft 23 to project at an outer end from the second casing 152.

A back surface of the support shaft 23 and a back surface of the middle of the outside lever 24 are covered with a lower end of the metal back member 25 fixed to a front surface of the body 4. A female thread hole 26 is formed in a lower end of the back member 25 facing the support shaft 23. A bolt 27 inserted from a front surface of the second casing 152 engages in the female thread hole 23 through the support shaft 23. Thus, the middle of the outside lever 24 is rotatably held between the second casing 152 and the back member 25. An inner end of the outside lever 24 is coupled to the opening lever (not shown) of the operating mechanism held in the operating-mechanism holding portion 16 of the first casing 151.

Figure 5:
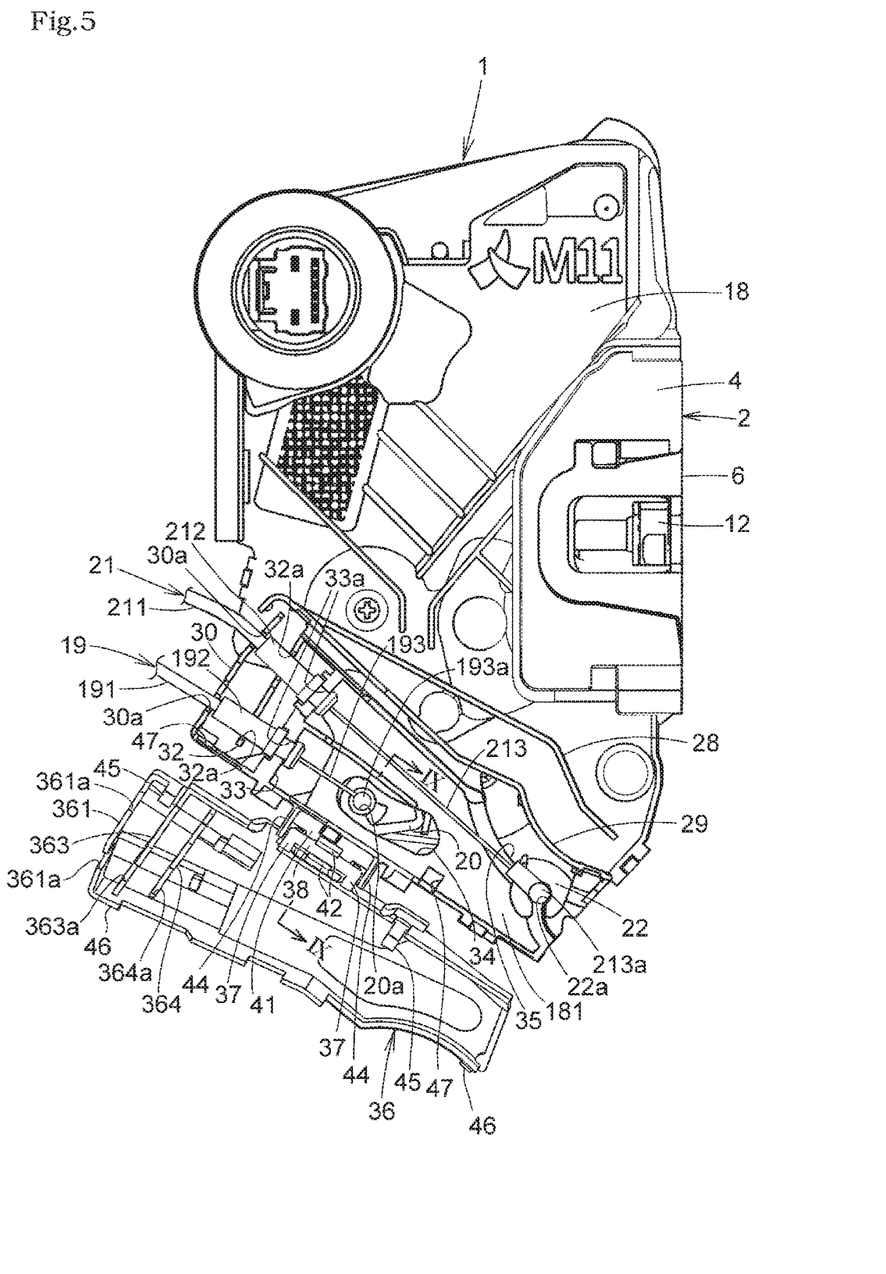
FIG. 5 is a side elevational view of the door latch device when the auxiliary cover mounted to the cover is held in a first open position, seen from the interior of the vehicle.
Figure 6:
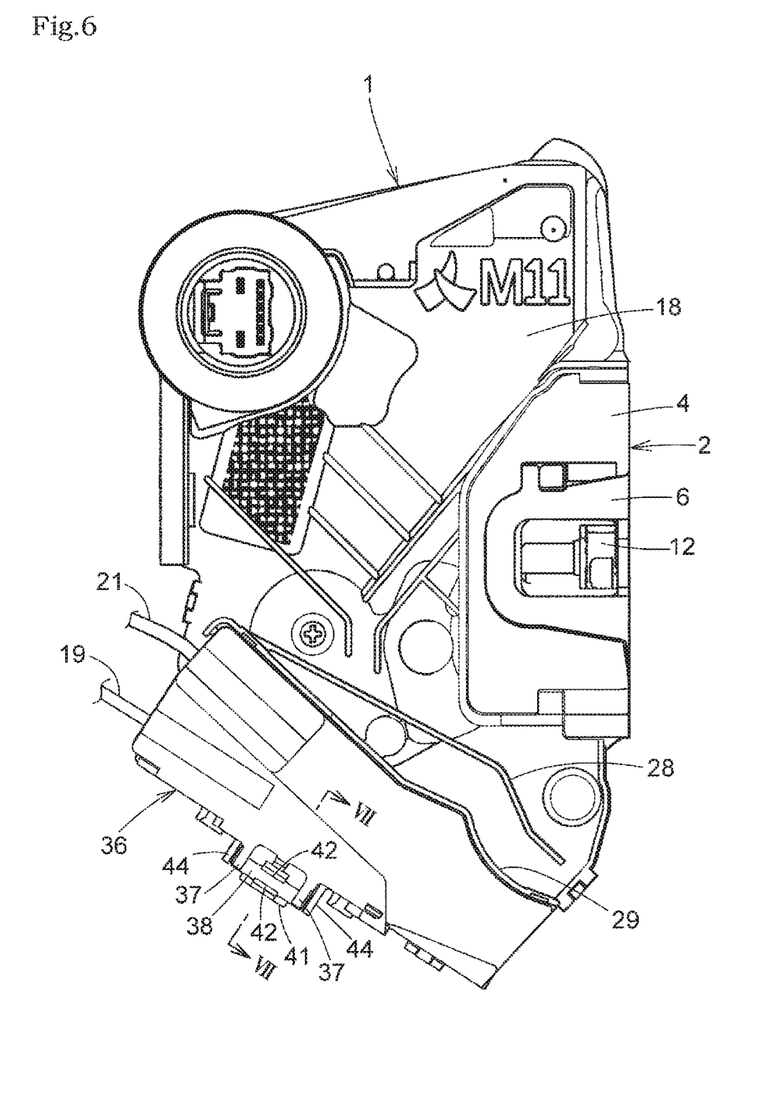
FIG. 6 is a side elevational view of the door latch device in which the auxiliary cover is closed, seen from the interior of the vehicle.

In FIGS. 5 and 6, there are an upper rain-water guiding projection 28 and a lower rain-water guiding projection 29 that project inward of the vehicle and tilt backward and downward at a lower part of a side of the cover 18. The upper rain-water guiding projection 28 and the lower rain-water guiding projection 29 guide rain water which flows down on the surface of the cover 18 backward and downward and prevent rain water from flowing down toward a cable-coupling area 181 later described.

Under the lower rain-water guiding projection 29 of the cover 18, the cable-coupling area 181 for coupling the first and second Bowden cables 19, 21 to the locking lever 20 and the inside lever 22 respectively is formed backward and downward. The cable coupling area 181 is formed with the lower rain water guiding projection 29 and a front edge of the cover 18. The cable coupling area 181 is surrounded by a vertical front wall 30 which projects inward of the vehicle and an inwardly-projecting lower wall 31 formed along a lower edge of the cover 18 tilted backward and downward.

The cable coupling area 181 comprises a vertical intermediate wall 32 that faces the front wall and projects inward of the vehicle; a vertical cable holding portion 33 that faces the vertical intermediate wall 32 slightly behind the vertical intermediate wall 32 and projects inward of the vehicle; an elongate hole 34 that is open to communicate with an inside of the operating mechanism 16 of the casing 15 and has a shape along a rotation path of a lower end of the locking lever 20; and a curve 35 that communicates with the inside of the operating mechanism holding portion 16 to let a lower end of the inside lever 22 project toward the cable coupling area 181 and has a shape along a rotation path. In the front wall 30, there are formed two engagement holes 30a, 30a in which ends of outer tubes 191, 211 of the first and second Bowden cables 19, 21 fit respectively, and in the intermediate wall 32, there are formed two engagement holes 32a, 32a in which larger-diameter portions 192, 212 of the first and second Bowden cables 19, 21 fit respectively. In the cable holding portion 33, there are formed holding holes 33a, 33a that hold the larger-diameter portions 192, 212 not to move axially by engaging in annular grooves at ends of the larger-diameter portions 192 and 212 of the first and second Bowden cables 19, 21.

A spherical coupling portion 193a at the end of an inner cable 193 of the first Bowden cable 19 fits in a semispherical concave portion 20a through the elongate hole 34. The concave portion 20a is formed at a lower end of locking lever 20 and is open inward of the vehicle. An axial coupling portion 213a at the end of an inner cable 213 of the second Bowden cable 21 fits in a fitting hole 22a at the lower end projecting from a notch 35 of the inside lever 22. Both of the coupling portions 193a, 213a are prevented by an auxiliary cover 36 (later described) closing the cable coupling area 181 from leaving the concave portion 20a and the fitting hole 22a. The concave portion 20a of the locking lever 20 and the fitting hole 22a of the inside lever 22 correspond to coupled portions.

The cable coupling area 181 is closed by the synthetic-resin auxiliary cover 36 coupled to the cover 18 after the first and second Bowden cables 19, 21 are coupled to the locking lever 20 and the inside lever 22 respectively.

Figure 3:
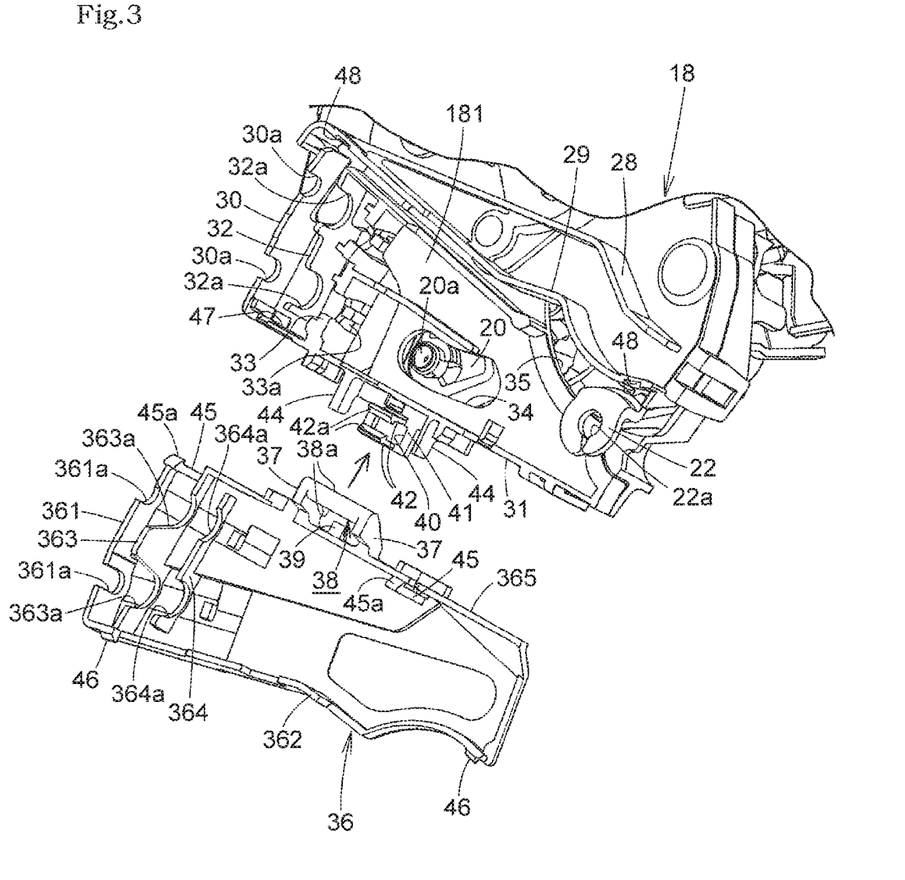
FIG. 3 is a perspective view of an auxiliary cover and a lower part of the door latch device before the auxiliary cover is attached, seen from the interior of the vehicle.
Figure 4:
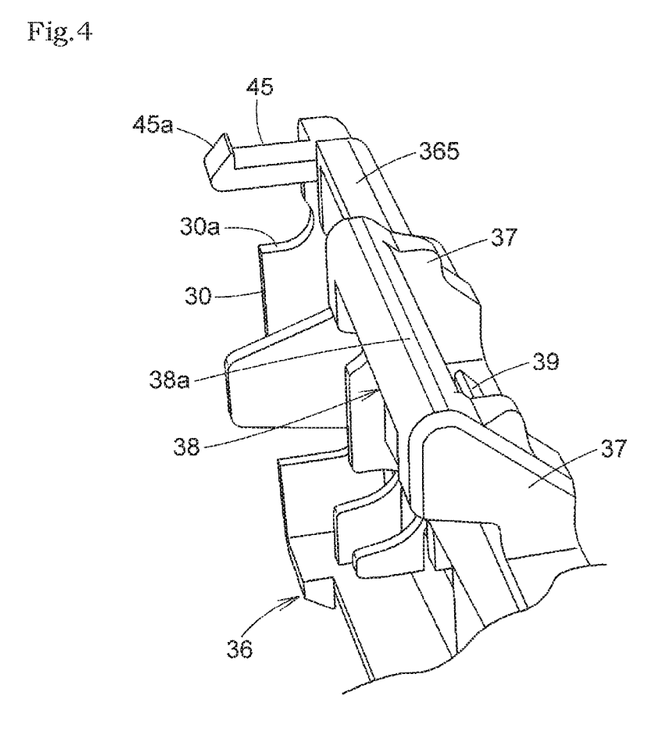
FIG. 4 is an enlarged perspective view of the auxiliary cover near a hinge, seen from above obliquely.

In FIG. 3, the auxiliary cover 36 has substantially the same shape as the cable coupling area 181. A side wall 361 projects toward the cable coupling area 181 at a frond end of the auxiliary cover 36 and is in contact with a front surface of a front wall 30 of the cover 18 when the cable coupling area 181 is closed. An upper wall 362 is continuous with the side wall 361, projects toward the cable coupling area 181 and can come in contact with a side toward the inside of the vehicle under a lower rain-water guiding projection 29 of the cover 18. Retaining grooves 361a, 361a are formed on the side wall 361 and can hold the outer tubes 191, 211 of the first and second Bowden cables 19, 21 from the interior of the vehicle when the cable coupling area 181 is closed.

On a front part of a back surface of the auxiliary cover 36, a first intermediate side wall 363 and a second intermediate side wall 364 project toward the cable coupling area 181 when the cable coupling area 181 is closed. When the cable coupling area 181 is closed, the back surface of the auxiliary cover 36 faces the cable coupling area 181. The first intermediate side wall 363 is positioned between the front wall 30 and the intermediate wall of the cover 18; and the second intermediate side wall 364 is positioned between the intermediate wall 32 and the cable holding portion 33. On the first intermediate side wall 363 and the second intermediate side wall 364, two retaining grooves 363a, 364a retains the larger-diameter portions 192, 212 of the first and second Bowden cables 19, 21 from the interior of the vehicle when the cable coupling area 181 is closed.

In FIGS. 3-7, a pair of projections 37, 37 bent backward projects upward from the middle of the upper edge of the auxiliary cover 36. The upper edge of the auxiliary cover 36 becomes the lower edge when the cable coupling area 181 is closed. Between the two projections 37 and 37, a hinge shaft 38 is spaced from and in parallel with the upper edge, and is integrally formed with the projections 37.

A cross section perpendicular to a length of the hinge shaft 38 is substantially elliptical, and flat portions 38a, 38a are formed on upper and lower surfaces along the length in parallel to each other. In this embodiment, a distance between the upper and lower flat portions 38a, 38a is slightly smaller than a distance between a pair of elastic holding portions 42 and 42 (later described) of the cover 18.

In the middle of the upper edge 365 of the auxiliary cover 36 between the projections 37 and 37, a tapered stopped portion 39 projects upward (or downward when the cable coupling area 181 is closed) The stopped portion 39 can be moved over the stopper portion 43 (later described) of the cover 18 to an opposite side by rotating with the auxiliary cover 36 around the hinge shaft 38.

Figure 7:
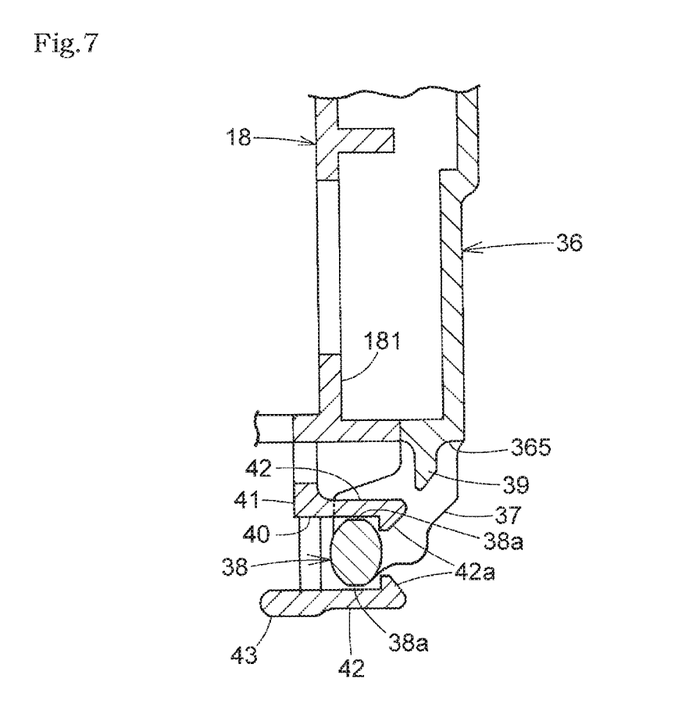
FIG. 7 is an enlarged sectional view taken along the line VII-VII in FIG. 6.
Figure 8:
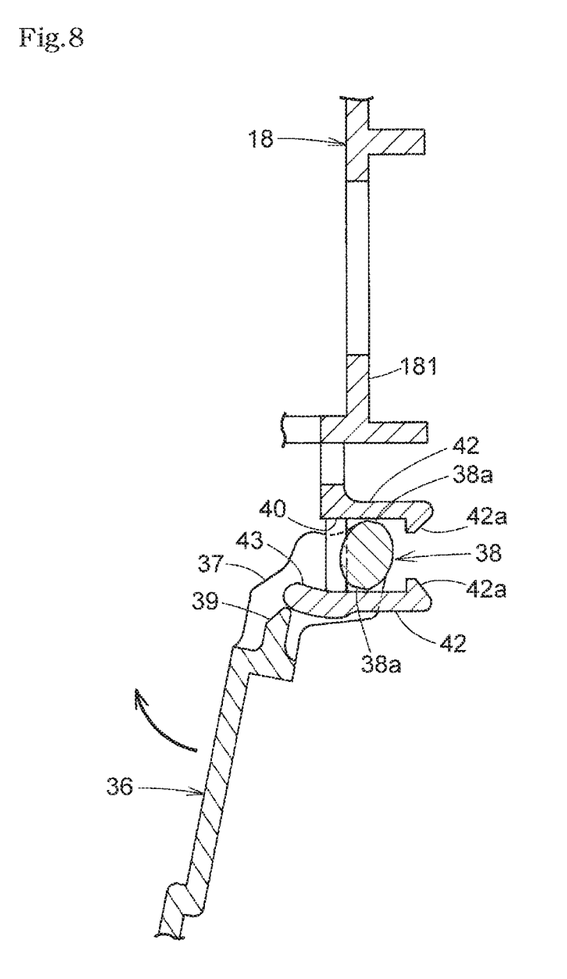
FIG. 8 is an enlarged sectional view when the auxiliary cover is rotated to the first open position, or an enlarged sectional view taken along the line VIII-VIII in FIG. 5.

As shown in FIG. 3 and a sectional view of FIG. 7, in the middle of a lower edge of the cable coupling area 181 of the cover 18 of the casing 15, a mounting portion 41 with a rectangular opening 40 for mounting the auxiliary cover 36 projects downward in the middle of the cable coupling area 181 of the cover 18 of the casing 15. On a surface of the mounting portion 41 opposite the interior of the vehicle, a pair of upper and lower holding portions 42, 42 for holding the hinge shaft 38 of the auxiliary cover 36 rotatably project inward of the vehicle with the opening 40 therebetween.

Figure 9:
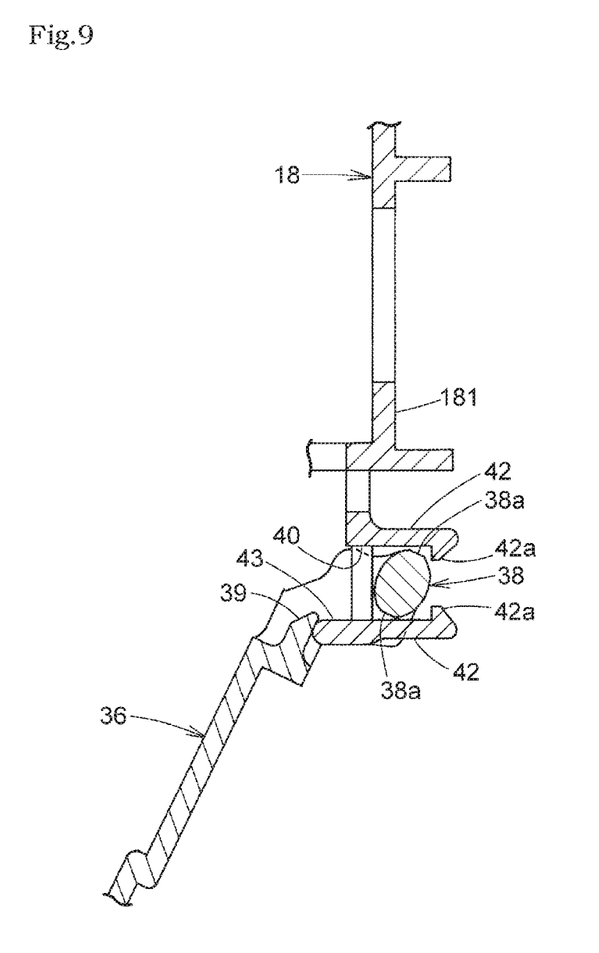
FIG. 9 is an enlarged sectional view taken along the line IX-IX in FIG. 5.

Pawls 42a, 42a opposite each other project inward at the ends of the upper and lower elastic holding portions 42. A distance between the pawls 42a and 42a is slightly smaller than the minimum external diameter along a shorter axis of the hinge shaft 38 so that the hinge shaft 38 may not go from between the elastic holding portions 42 and 42. In FIG. 9, by contacting the stopped portion 39 from above, the stopper portion 43 for stopping and holding the stopped portion 36 provisionally at a first open position is positioned at a rotation path of the end of the stopped portion 39, which will be described later.

At the lower edge of the cable coupling area 181 of the cover 18, longitudinal-motion limiting portions 44, 44 that limit the auxiliary cover 36 from moving longitudinally of the vehicle project downward and holds the mounting portion 41 therebetween. A distance between the longitudinal-motion limiting portions 44 and 44 is slightly greater than a distance between outer surfaces of the projections 37, 37 of the auxiliary cover 36. When the hinge shaft 38 fits between the upper and lower elastic portions 42 and 42, the outer surfaces of the projections 37 come close to or in contact with the pair of longitudinal-motion limiting portions 44, thereby preventing the auxiliary cover 36 from moving with respect to the cover 18 longitudinally of the vehicle in FIGS. 5 and 6.

In FIG. 3, at a front end and a rear part of the auxiliary cover 36 close to the upper edge 365, engagement portions 45, 45 with engagement projections 45a, 45a project outward of the vehicle when the cable coupling area 181 is closed.

There are engagement protrusions 46, 46 on a lower surface (or an upper surface when the cable coupling area 181 is closed) of the upper wall 362 of the auxiliary cover 36.

When the cable coupling area 181 is closed by the auxiliary cover 36, the engagement portions 45, 45 engages in engagement holes 47, 47 at the lower edge of the cable coupling area 181 of the cover 18 to make the engagement projections 45a, 45a engage with the deepest opening edges.

When the cable coupling area 181 is closed by the auxiliary cover 36, the engagement protrusions 46 engage engaged protrusions 48, 48 on the lower surface of the lower rain-water guide projection 29 of the cover 18. With the two engagement portions 45 and the two engagement protrusions 45, the auxiliary cover 36 is fixed to the cable coupling area 181 of the cover 18 at four points securely without loosening.

In order to mount the auxiliary cover 36 over the cover 18, the hinge shaft 38 of the auxiliary cover 38 engages between the upper and lower elastic holding portions 42 and 42 of the cover 18 while the elastic holding portions 42 are elastically enlarged. If the hinge shaft 38 is engaged from a longitudinal axis, it is easier to engage because an elastic deformation of both the elastic holding portions 42 is small.

The auxiliary cover 36 can rotate vertically around the hinge shaft 38 between a closed position where the cable coupling area 181 is closed in FIGS. 6 and 7, and a first open position where the auxiliary over 36 is provisionally held, for example, at about 210 degrees from the closed position in FIGS. 5 and 9.

In order to hold the auxiliary cover 36 in the first open position in FIG. 9 provisionally, the hinge shaft 38 is rotated in an opening direction while the hinge shaft 38 is moving toward the opening 40 of the mounting portion 41 or toward the exterior of the vehicle. Then, in FIG. 8, the end of the stopper portion 43 of the cover 18 is elastically deformed upward by the stopped portion 39 of the auxiliary cover 36, and the stopped portion 39 gets over the end of the stopper portion 43 in FIG. 9. Hence, a lower surface of the stopped portion 39 comes in contact with an upper surface of the stopper portion 43, and the auxiliary cover 36 is prevented from rotating in a closing direction. The auxiliary cover 36 stops at the first open position securely and is held provisionally.

The auxiliary cover 36 at the first open position is rotated in a closing direction, the stopper portion 43 is elastically deformed downward by the stopped portion 39 contrary to the above, and the auxiliary cover 36 can be rotated to the closed position smoothly. If the stopped portion 39 gets over the end of the stopper portion 43 by moving the hinge shaft 38 toward the opening 40 greatly, the auxiliary cover 36 can be held at the first open position by contacting the lower surface of the stopped portion 39 with the upper surface of the stopper portion 43 without deforming the stopper portion 43 with the stopped portion 39.

When the auxiliary cover 36 is held provisionally at the first open position, the auxiliary cover 36 is prevented securely from rotating in the closing direction. Thus, when the door latch device is installed in the door D, when the first and second Bowden cables 19, 21 are connected to the cable coupling area 181 and when the inner cables 193, 213 are coupled to the locking lever 20 and the inside lever 22, the auxiliary cover 36 is prevented from rotating improperly or from interrupting the rotation, thereby improving its operation efficiency.

As mentioned above, in the door latch device in the first embodiment, the hinge shaft 38 of the auxiliary cover 36 is rotatably disposed between the pair of elastic holding portions 42 and 42. When the auxiliary lever 36 is rotated in the opening direction, the stopped portion 39 gets over the end of the stopper portion 43 and moves to an opposite side, thereby preventing the auxiliary cover 36 from rotating in the closing direction to hold the auxiliary cover 36 provisionally in the first open position. Hence, the structure for holding the auxiliary cover 36 provisionally at the first open position is simpler than conventional provisionally-holding means for a door latch device thereby reducing the cost for molding the casing 15 and the auxiliary cover 36.

Figure 10:
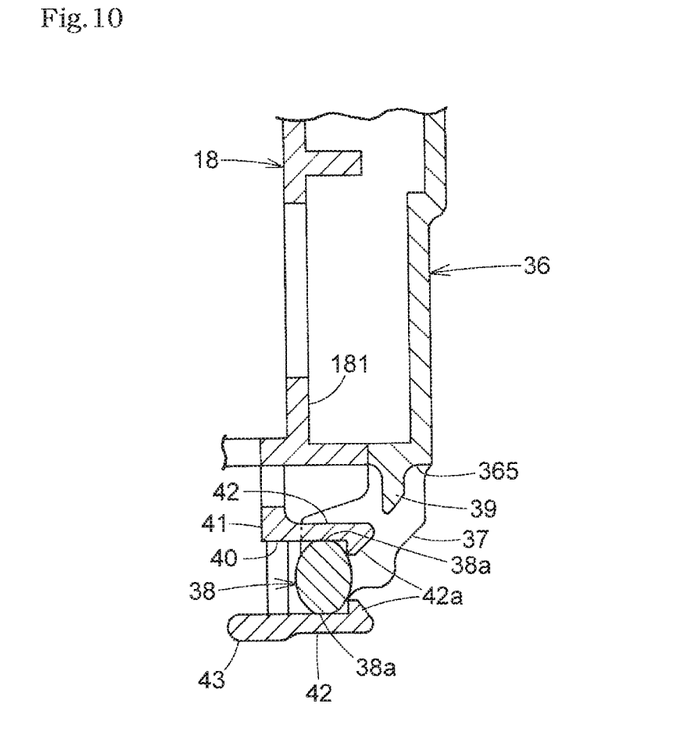
FIG. 10 is an enlarged sectional view of a second embodiment of a the door latch device, similar to FIG. 6.
Figure 11:
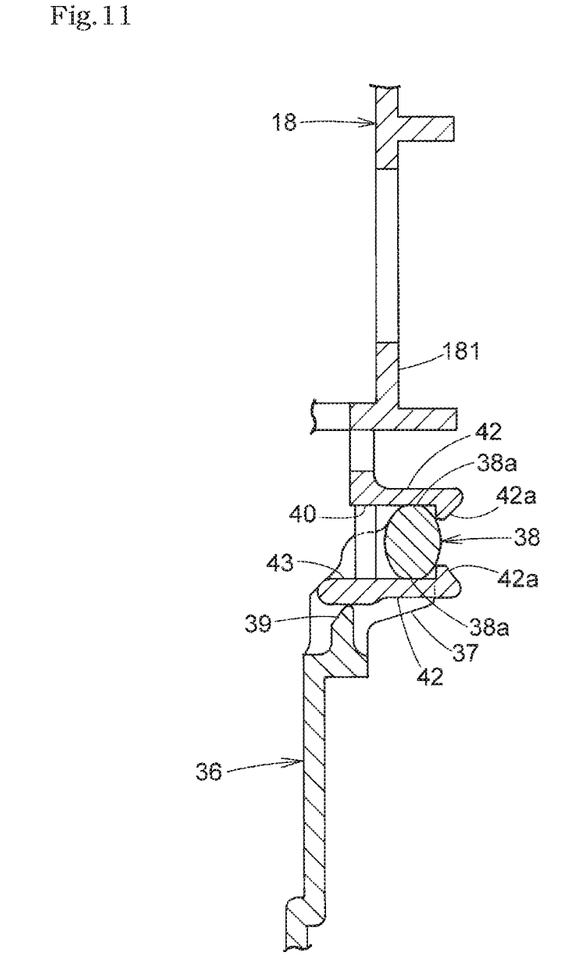
FIG. 11 is an enlarged sectional view of the auxiliary cover held provisionally in a second open position.

FIGS. 10 and 11 illustrate sectional views of an auxiliary-cover mounting portion 36 in a second embodiment of a door latch device. In the second embodiment, upper and lower flat surfaces 38a, 38a of the hinge shaft 38 as a rotation preventing portion holds the auxiliary cover 36 at a second open position in which the auxiliary cover 36 is open at about 180 degrees.

In the second embodiment, a distance between the upper elastic holding portion 42a and the lower elastic holding portion 42 is smaller than a distance between the upper flat portion 38a and the lower flat portion 38a of the hinge shaft 38. When the auxiliary cover 36 is in the closed position where the cable coupling area 181 is closed and in the second open position where the auxiliary cover 36 rotates by 180 degrees to open the cable coupling area 181, the elastic holding portions 42 elastically holds the upper and lower flat surfaces 38a, 38a of the hinge shaft 38 that fits between the elastic holding portions 42 and 42.

A cross section of the hinge shaft 38 is elliptical and the flat portion 38a is formed on an outer circumference in an axial direction as the rotation preventing portion. When the auxiliary cover 36 is in the closed position and the second open position, an elastic deformation of the elastic holding portion 42 becomes the greatest in an expanding direction, and a reaction force gets the greatest. Thus, both the elastic holding portions 42,42 strongly presses the upper and lower flat portions 38a thereby preventing the hinge shaft 38 from rotating relative to the elastic holding portions 42 and increasing a holding force for holding the auxiliary cover 36 provisionally in the closed position. When the auxiliary cover 36 rotates from the closed position to the second open position and vice versa, elastic deformation of both the elastic holding portions 42 reduces gradually, and a pressing force on the hinge shaft 38 reduces, so that the auxiliary cover 36 can be rotated without resistance.

In the second embodiment of the door latch device, when the auxiliary cover 36 in the closed position is rotated by 180 degrees in the opening direction, the upper and lower elastic holding portions 42 of the cover 18 elastically press the upper and lower flat portions 38a of the hinge shaft 38, thereby preventing the hinge shaft 38 from rotating relative to both the elastic holding portions 42 and preventing the auxiliary cover 36 from rotating in the opening or closing direction. Hence, the auxiliary cover 36 is held provisionally in the second open position where it is open by 180 degrees. In FIG. 11, when the auxiliary lever 36 is held in the second open position, the upper end of the stopped portion 39 is close to or in contact with the lower surface of the stopper portion 43, thereby preventing the auxiliary cover 36 from rotating beyond the second open position. In the second embodiment, if the auxiliary cover 36 is rotated beyond the second open position, the auxiliary cover 36 can be held provisionally in the first open position as well as the first embodiment.

In the second embodiment of the door latch device, the auxiliary cover 36 has the nearly elliptical hinge shaft 38 with the flat portions 38a, 38a (rotation preventing portion) in parallel with each other on the upper and lower outer circumference. The hinge shaft 38 fits between the pair of upper and lower elastic holding portions 42 and 42 of the cover 18, and both the elastic holding portions 42 are elastically pressed on the upper and lower rotation preventing portions 38a. Thus, the auxiliary cover 36 is held provisionally in the second open position where the auxiliary cover 36 is open by 180 degrees. The structure for holding the auxiliary cover 36 provisionally in the open position is simpler than provisionally-holding means of the conventional door latch device thereby reducing the cost for molding the cover 18 and the auxiliary cover 36.

The auxiliary cover 36 is held provisionally in the second open position where the auxiliary cover 36 is open by 180 degrees, thereby improving an operation for connecting the door latch device into the door D and for the first and second Bowden cables 19, 21 into the cable coupling area 181.

The foregoing relates to the embodiments of the invention. The following variations and changes may be made to the embodiments without departing from the gist of the invention.

Figure 12:
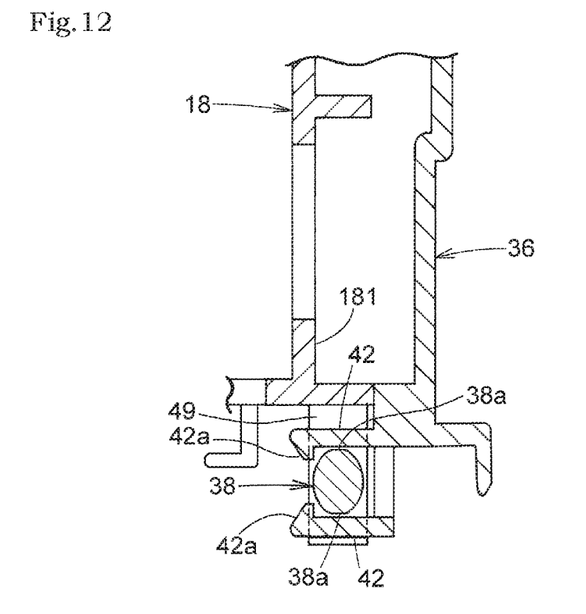
FIG. 12 is an enlarged sectional view of a variation of a mounting portion of the cover and the auxiliary cover, similar to FIG. 6.
Figure 13:
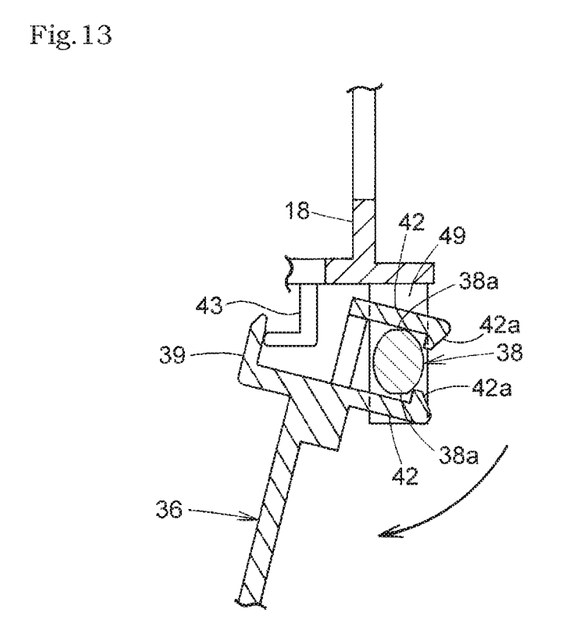
FIG. 13 is an enlarged sectional view of the auxiliary cover held provisionally in a first open position.

In the foregoing embodiments, the hinge shaft 38 is disposed on the auxiliary cover 36, and fits in the pair of upper and lower elastic holding portions 42 of the cover 18, but the relation may be reversed in FIG. 12. Namely, for example, on a lower surface of the cover 18, a pair of mounting portions 49 opposite each other for mounting the auxiliary cover 36 projects on a lower surface of the cover 18, and a hinge shaft 38 similar to that in the first embodiment is disposed between the mounting portions 49. The upper and lower elastic holding portions 42 project reversely to the foregoing embodiment on a lower surface of the cover 18. The elastic holding portions 42 fits on the hinge shaft 38 rotatably from the interior of the vehicle. For example, on a lower edge (upper edge when closed) of the auxiliary cover 36 and a lower surface of the cover 18, a stopped portion 39 and a stopper portion 43 similar to the foregoing embodiments are provided respectively. When the auxiliary cover 39 is rotated in an opening direction to a position beyond 180 degrees, the stopped portion 39 gets over the stopper portion 43. In FIG. 13, the auxiliary cover 36 can be held provisionally in the first open position as well as the first embodiment.

In the second embodiment, the flat portions 38a (rotation preventing portion) are formed on the upper and lower surfaces axially of the hinge shaft 38, but one flat portion 38a may be provided without one of the upper and lower surfaces. When the auxiliary cover 36 is rotated by 180 degrees, one of the flat portions 38a is elastically pressed on one of the upper and lower elastic holding portions 42. Thus, the auxiliary cover 36 can be held provisionally in the second open position. If one of the upper and lower flat portions 38a is omitted, a length of the flat portion 38a may be greater than the foregoing embodiments in order to increase a provisional holding force of the elastic holding portion 42 of the auxiliary cover 36.

In the foregoing embodiments, the hinge shaft 38 and the elastic holding portions 42 are provided in the middle of the auxiliary cover 36 and the cover 18, but may be provided at ends of the auxiliary cover 36 and the cover 36 at two positions.

A cross section of the hinge shaft 38 is circular, and a flat portion 38a may be provided on upper and lower surfaces or one of the surfaces.

What is claimed is:

1. A vehicle door latch device comprising:
   a casing with an opening;
   first and second motion transmitting members respectively having a coupling portion at an end to transmit respective a motions of a locking knob and an inside handle;
   a locking lever disposed in the casing and having a coupled portion for coupling the coupling portion of the first motion transmitting member for the locking knob through the opening of the casing;
   an inside lever disposed in the casing and having a coupled portion for coupling the coupling portion of the second motion transmitting member for the inside handle through the opening of the casing;
   an auxiliary cover coupled to the casing to close a coupling area in which the respective coupling portions of the first and second motion transmitting members are coupled with the respective corresponding coupled portions of the locking lever and the inside lever;
   a hinge shaft disposed on one of the casing and the auxiliary cover;
   a pair of elastic holding portions disposed on the other of the casing and the auxiliary cover, the hinge shaft engaging in between the pair of elastic holding portions so as to rotate between a closed position where the coupling area is closed by the auxiliary cover and an open position where the coupling area is open;
   a stopped portion disposed on the auxiliary cover; and
   a stopper portion disposed on the casing, the stopper portion being capable of contacting with the stopped portion,
   wherein, when the auxiliary cover is rotated in an opening direction, the stopped portion gets over an end of the stopper portion, moves to an opposite side and prevents the auxiliary cover from rotating in a closing direction thereby holding the auxiliary cover provisionally in the open position;
   wherein the stopped portion is arranged so as to be separate from and opposite to the hinge shaft, and rotates with the auxiliary cover around the hinge shaft;
   wherein the stopper portion is disposed on the casing so as to be positioned at a rotation path of an end of the stopped portion; and
   wherein the stopped portion rotates around the hinge shaft so as to face the hinge shaft when getting over the end of the stopper portion and moving to the opposite side.

2. The vehicle door latch device of claim 1 wherein on an outer circumferential surface of the hinge shaft, there is provided a rotation preventing portion that can hold the auxiliary cover provisionally in a second open position by elastically contacting with at least one of opposite surfaces of the two elastic holding portions and preventing the hinge shaft from rotating relative to the elastic holding portion.

3. The vehicle door latch device of claim 2 wherein a cross-section of the hinge shaft is substantially elliptical.

4. The vehicle door latch device of claim 3 wherein a pair of rotation preventing portions is formed in parallel to each other and elastically contact with the pair of elastic holding portions, thereby holding the auxiliary cover provisionally in the second open position in which the auxiliary cover is open by around 180 degrees.

5. The vehicle door latch device of claim 4 wherein the pair of rotation preventing portion comprise an upper flat surface and a lower flat surface respectively.

6. The vehicle door latch device of claim 1 wherein the hinge shaft is disposed on the auxiliary cover and the pair of elastic holding portions is disposed on the casing.

7. A vehicle door latch device comprising:
   a casing with an opening;
   first and second motion transmitting members respectively having a coupling portion at an end to transmit respective motions of a locking knob and an inside handle;
   a locking lever disposed in the casing and having a coupled portion for coupling the coupling portion of the first motion transmitting member for the locking knob through the opening of the casing;
   an inside lever disposed in the casing and having a coupled portion for coupling the coupling portion of the second motion transmitting member for the inside handle through the opening of the casing;
   an auxiliary cover coupled to the casing to close a coupling area in which the respective coupling portions of the first and second motion transmitting members are coupled with the respective corresponding coupled portions of the locking lever and the inside lever;
   a hinge shaft disposed on one of the casing and the auxiliary cover;
   a pair of elastic holding portions disposed on the other of the casing and the auxiliary cover, the hinge shaft engaging in between the pair of elastic holding portions so as to rotate between a closed position where the coupling area is closed by the auxiliary cover and an open position where the coupling area is open;
   a stopped portion disposed on the auxiliary cover; and
   a stopper portion disposed on the casing, the stopper portion being capable of contacting with the stopped portion,
   wherein, when the auxiliary cover is rotated in an opening direction, the stopped portion gets over an end of the stopper portion, moves to an opposite side and prevents the auxiliary cover from rotating in a closing direction thereby holding the auxiliary cover provisionally in the open position;
   wherein on an outer circumferential surface of the hinge shaft, there is provided a rotation preventing portion that can hold the auxiliary cover provisionally in a second open position by elastically contacting with at least one of opposite surfaces of the two elastic holding portions and preventing the hinge shaft from rotating relative to the elastic holding portion;
   wherein a cross-section of the hinge shaft is substantially elliptical;
   wherein a pair of rotation preventing portions is formed in parallel to each other and elastically contact with the pair of elastic holding portions, thereby holding the auxiliary cover provisionally in the second open position in which the auxiliary cover is open by around 180 degrees.

8. The vehicle door latch device of claim 7 wherein the pair of rotation preventing portion comprise an upper flat surface and a lower flat surface respectively.

* * * * *